US012767225B2

(12) United States Patent
Blessum et al.

(10) Patent No.: US 12,767,225 B2
(45) Date of Patent: Oct. 20, 2026

(54) ARTICULATED WORK MACHINE WITH INDIVIDUALLY POWERED DRIVE MEMBERS

(71) Applicant: The Charles Machine Works, Inc., Perry, OK (US)

(72) Inventors: Dustin L. Blessum, Edmond, OK (US); Michael D. Buck, Perry, OK (US); Dylan J. Cook, Broken Arrow, OK (US); Brant D. Kukuk, Perry, OK (US); Victor L. Schmidlkofer, Perry, OK (US); Todd J. Streck, Marshall, OK (US); Christopher Trimble, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 573 days.

(21) Appl. No.: 18/364,627

(22) Filed: Aug. 3, 2023

(65) Prior Publication Data

US 2024/0059352 A1 Feb. 22, 2024

Related U.S. Application Data

(60) Provisional application No. 63/395,517, filed on Aug. 5, 2022.

(51) Int. Cl.

| | |
|---|---|
| ***B62D 12/00*** | (2006.01) |
| ***B62D 11/00*** | (2006.01) |
| ***B62D 11/04*** | (2006.01) |
| ***B62D 51/00*** | (2006.01) |
| ***B62D 51/02*** | (2006.01) |

(Continued)

(52) U.S. Cl.
CPC ............ *B62D 12/00* (2013.01); *B62D 11/003* (2013.01); *B62D 11/04* (2013.01); *B62D 51/001* (2013.01); *B62D 51/008* (2013.01); *B62D 51/02* (2013.01); *E02F 3/283* (2013.01); *E02F 9/0841* (2013.01); *E02F 9/2087* (2013.01)

(58) Field of Classification Search
CPC ...... B62D 12/00; B62D 11/003; B62D 11/04; B62D 51/001; B62D 51/008; B62D 51/02; B62D 11/20; E02F 3/283; E02F 9/0841; E02F 9/2087; E02F 3/3405; E02F 9/2095
See application file for complete search history.

(56) References Cited

U.S. PATENT DOCUMENTS

| | | | | |
|---|---|---|---|---|
| 4,947,956 A | | 8/1990 | Henline | |
| 5,533,587 A | * | 7/1996 | Dow .................... | B62D 11/20 180/245 |

(Continued)

*Primary Examiner* — Valentin Neacsu
*Assistant Examiner* — Marlon A Arce
(74) *Attorney, Agent, or Firm* — Tomlinson McKinstry, P.C.

(57) ABSTRACT

An articulated work machine with individually powered drive members. Each drive member is controlled by a corresponding electric motor, and is capable of rotating at a different speed and in the opposite rotational direction than all other drive members. Each drive member may also remain stationary while all other drive members rotate. The electric motors are commanded by a controller, which may be directed by inputs from by an operator. A lift arm extends from the front end of the vehicle, and a platform station extends from the rear end of the vehicle. The lift arm is connected to a tool, such as a bucket.

20 Claims, 9 Drawing Sheets

(51) Int. Cl.

| | |
|---|---|
| *E02F 3/28* | (2006.01) |
| *E02F 9/08* | (2006.01) |
| *E02F 9/20* | (2006.01) |

(56) References Cited

U.S. PATENT DOCUMENTS

| | | | | | |
|---|---|---|---|---|---|
| 6,131,520 | A * | 10/2000 | Dull | B60L 5/19 | 105/164 |
| 6,658,768 | B1 * | 12/2003 | Bainter | E02F 3/10 | 37/360 |
| 6,715,579 | B1 | 4/2004 | Hendron | | |
| D572,274 | S * | 7/2008 | Buck | D15/10 | |
| 7,398,842 | B2 * | 7/2008 | Fontecchio | B62D 11/20 | 280/304 |
| 8,485,287 | B2 * | 7/2013 | Sewell | B62D 51/02 | 37/352 |
| 8,534,415 | B2 * | 9/2013 | Roose | B62D 12/00 | 180/419 |
| 10,293,853 | B2 | 5/2019 | Koike et al. | | |
| 12,351,235 | B2 * | 7/2025 | Cook | B60P 1/56 | |
| 2019/0003147 | A1 * | 1/2019 | Rosenpek | E02F 9/0875 | |
| 2020/0353931 | A1 * | 11/2020 | Römer | B62D 11/02 | |
| 2024/0059352 | A1 * | 2/2024 | Blessum | B62D 51/02 | |
| 2024/0068195 | A1 * | 2/2024 | Streck | E02F 9/0841 | |

* cited by examiner

ARTICULATED WORK MACHINE WITH INDIVIDUALLY POWERED DRIVE MEMBERS

SUMMARY

The present invention is directed to an articulated work machine. The work machine comprises an articulation joint, a first chassis, a second chassis, and a controller. The first chassis has two independently operable drive members. The second chassis has two independently operable drive members. The first chassis and second chassis are connected at the articulation joint. The controller is configured to operate a first of the independently operable drive members at a speed distinct from a second of the independently operable drive members, operate a first of the independently operable drive members in a direction opposite from a second of the independently operable drive members, operate a first of the independently operably drive members while not allowing a second of the independently operable drive members to move, and operate a first of the independently operable drive members and a second of the independently operable drive members at the same direction and speed.

In another aspect, the present invention is directed to an articulated work vehicle. The articulated work vehicle comprises a first chassis, a second chassis, and an articulation joint disposed between the first chassis and the second chassis. The first chassis comprises a first right wheel operatively connected to a first motor and a first left wheel operatively connected to a second motor. The second chassis comprises a second right wheel operatively connected to a third motor and a second left wheel operatively connected to a fourth motor. Each of the wheels is configured to be rotated in a first direction and a second direction opposite the first direction. The articulated work vehicle further comprises a controller. The controller is operatively connected to each of the first, second, third and fourth motors such that the articulated work vehicle moves along a desired path of travel.

The present invention is also directed to an apparatus. The apparatus comprises a first chassis, a second chassis, an articulation joint, and a controller. The first chassis comprises a first ground supporting drive member, independently powered and rotated by a first motor and a second ground supporting drive member, independently powered and rotated by a second motor. The second chassis comprises a third ground supporting drive member, independently powered and rotated by a third motor, and a fourth ground supporting drive member, independently powered rotated by a fourth motor. The articulation joint is disposed between the first chassis and the second chassis, and the controller is configured to receive an operator input and direct a speed and direction of each of the first, second, third and fourth motor in response to the operator input.

DETAILED DESCRIPTION

Certain industries such as construction and demolition require mass transportation of large loads and bulky materials. While there are many ways to move these materials, motorized vehicles are frequently used for this purpose. Though motorized vehicles such as skid steers and articulating vehicles are popular, they present specific challenges and drawbacks. Some of these limitations include destructive paths from wheels or tracks, undesirable tipping points due to poor balance, and limited paths of motion. Thus, there is a need for an improved way to transport jobsite materials.

Skid steer vehicles without articulating joints, especially tracked vehicles, provide an operator with the least turf damage. However, skid steers are not as maneuverable as articulating vehicles, and may require a turn radius that is not feasible for certain areas, such as on construction sites. As a result, articulating vehicles, which can bend at their midpoint, may be favored.

Currently, most articulating loaders use hydraulic power to turn axles for propulsion. These loaders have front wheels and back wheels that are connected together. The wheels can vary in speed to maintain consistent pressure between the wheel sets when the joint is articulated. However, the wheels are not commanded to rotate at different speeds by a controller. While these articulating loaders do a fair job of maintaining turf, they still exert a force below the tire tread that can damage the turf. This damaging force is increased when the wheels are articulated while the machine is not travelling in forward or reverse.

These traditional articulating loaders have other limitations in addition to damaging turf. For example, there is no way to determine which end of the machine will move when it is commanded to articulate from a static position. This adds challenges when the vehicle is being operated in tight spaces because the operator cannot anticipate or control which articulated end will move to make a turn. Thus, there are needs among currently available articulated vehicles to provide more predictable turning and pivoting controls for operators.

Figure 1:
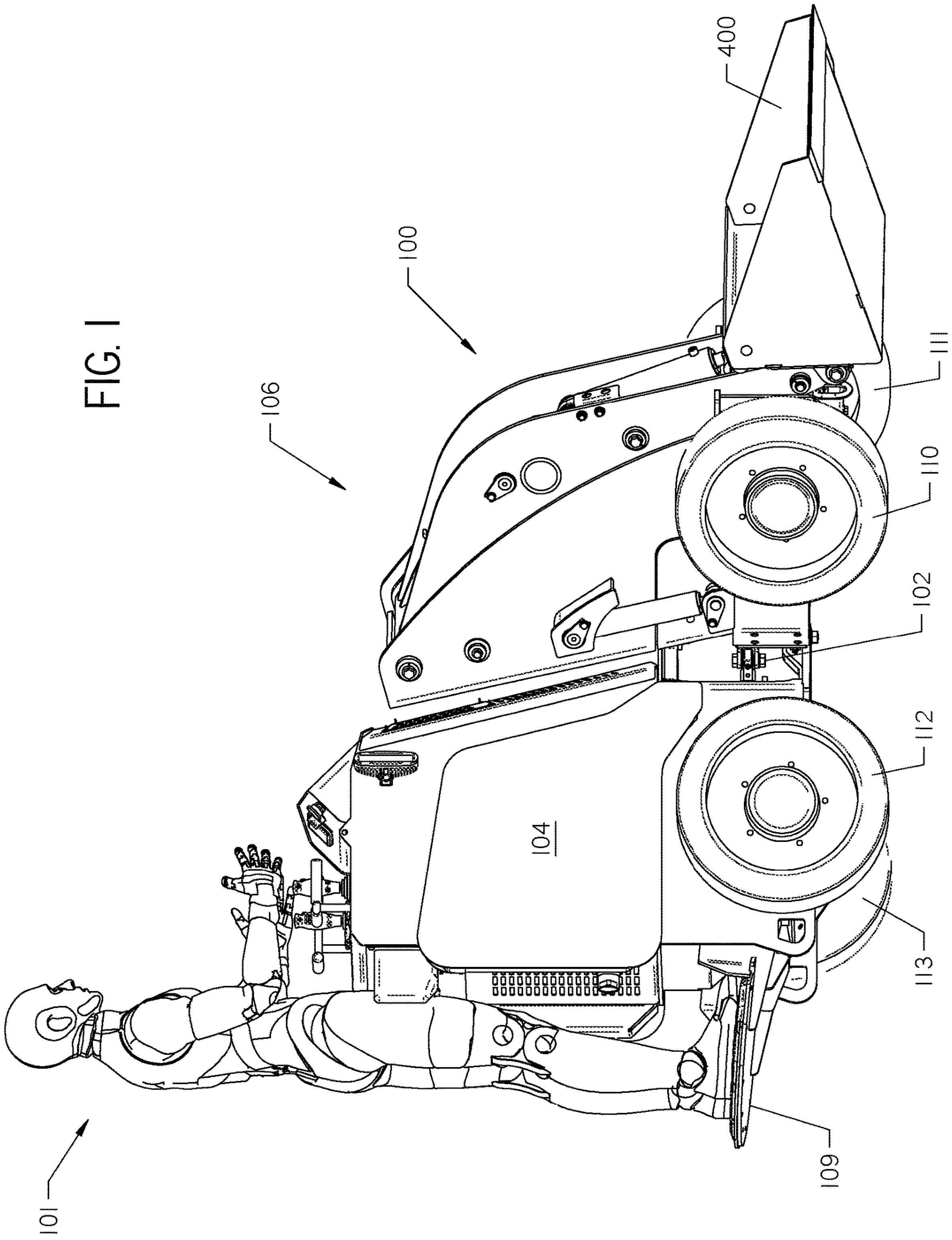
FIG. 1 is a perspective view of an articulated work vehicle being operated by a person.

Turning now to the figures and the present invention, FIG. 1 shows an operator 101 moving an electric articulating tool vehicle 100. The vehicle comprises a rear chassis section 104 and a front chassis section 106 connected by an articulation joint 102. The vehicle 100 is supported at its front section 106 by front ground supporting drive members 110 and 111 and at its rear section 104 by rear ground supporting drive members 112 and 113. As shown, the ground supporting drive members 110-113 are wheels, though individual steel or rubber tracks may also be utilized. As described herein, each wheel 110-113 is controlled by a distinct motor 120, and can thus be selectively commanded to rotate at a different speed and direction than all other wheels. Preferably, each motor 120 is an electric motor, powered by a battery onboard the vehicle 100.

As used herein, the wheel-motor interfaces are identical, with each wheel 110-113 being individually operated by the onboard controller. For the purposes of this disclosure and the figures, the conventions “front”, “rear”, “right” and “left” are utilized, from the frame of reference of the operator 101. Using this convention, the Figures disclose a front right wheel 110, a front left wheel 111, a rear right wheel 113, and a rear left wheel 114.

It should be understood that, for the purposes of this disclosure, an “inner wheel” is a wheel on the “inside” of a curve relative to the path of travel, while an “outer wheel” is the wheel on the “outside” of a curve. Whether a wheel is an “inner” or “outer” wheel is determined only by the direction of a turn. For example, in FIG. 2, left wheels 111, 113 are “inner”, as the center of curvature is on the left. In FIG. 3, left wheels 111, 113 are “outer”, as the center of curvature is on the right.

The use of individual motors 120 leads to greater maneuverability, and reduction in the amount of damage to the turf below the vehicle 100. Moving the wheels 110-113 in different speeds and directions, combined with the coordinated use of an articulation joint 102, allows the vehicle 100 to have tighter turning radii, which increases its functionality in the workplace.

Figure 8:
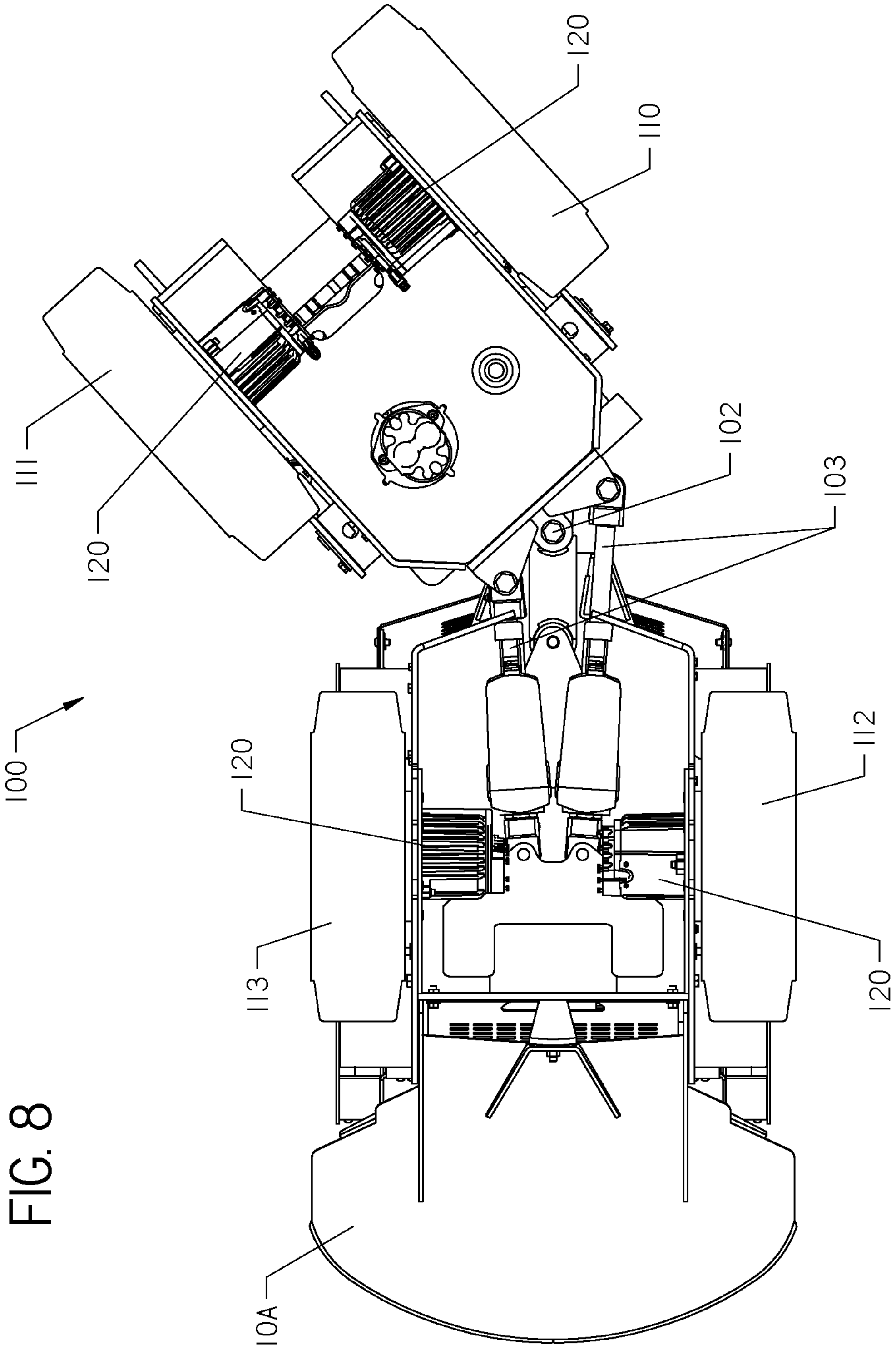
FIG. 8 is a top view of the vehicle showing the electric motors. Each electric motor is paired to a separate wheel.

Turning now to FIG. 8, the vehicle 100 uses individually controlled electric motors 120 for each wheel, as opposed to the traditional hydraulic wheel motors used in articulating loaders. As shown, each wheel has a single electric motor 120 that provides the wheel 110-113 with motive force. Four electric motors 120 are shown in FIG. 8, but there may be more depending on the number of wheels present in the work vehicle 100. Each of the first, second, third and fourth motors 120 power an individual wheel 110-113. The electric motors 120 provide feedback, which, in combination with the angle of articulation of the articulation joint 102, increases the mobility and functionality of the vehicle Dm.

An added benefit of the electric motors 120, powered by a battery or other current source, is that no gas or diesel powered engine is required. The lack of a combustion engine eliminates fumes which would otherwise be exhausted by the vehicle 100. The vehicle 100 may therefore be used in more universal settings, such as indoors, without having to monitor and accommodate harmful emission fumes. The present invention may be used in fully indoor workspaces without requiring workers to wear fumigation protection equipment. This can reduce the cost and time of operation. An internal combustion engine can be used to generate electric power for the vehicle in some applications.

In addition to increased mobility and selective articulation control, the vehicle provides active traction control. The traction state of each individual wheel 110-113 can be determined using feedback from the individual electric motors 120. For example, a slip in traction can be detected by an abrupt drop in motor current and/or an overshoot of velocity. When a slip is detected, the controller may adjust the speed of the appropriate motor briefly then return to the desired speed. This added feature reduces error in the paths traveled.

Figure 3:
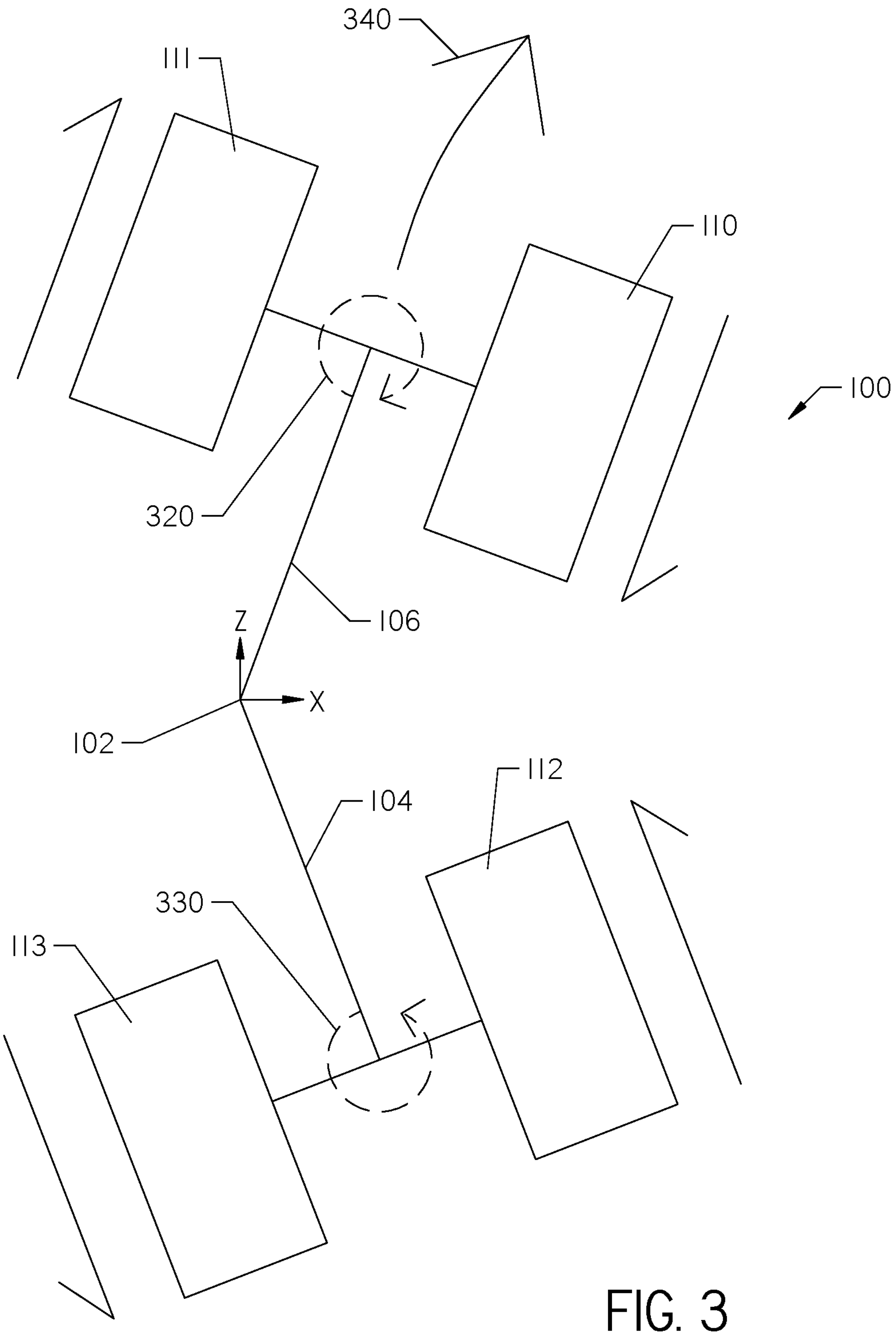
FIG. 3 is a top view illustration showing the vehicle in traditional articulating mode. The direction of rotation of each wheel is shown by an arrow.
Figure 4:
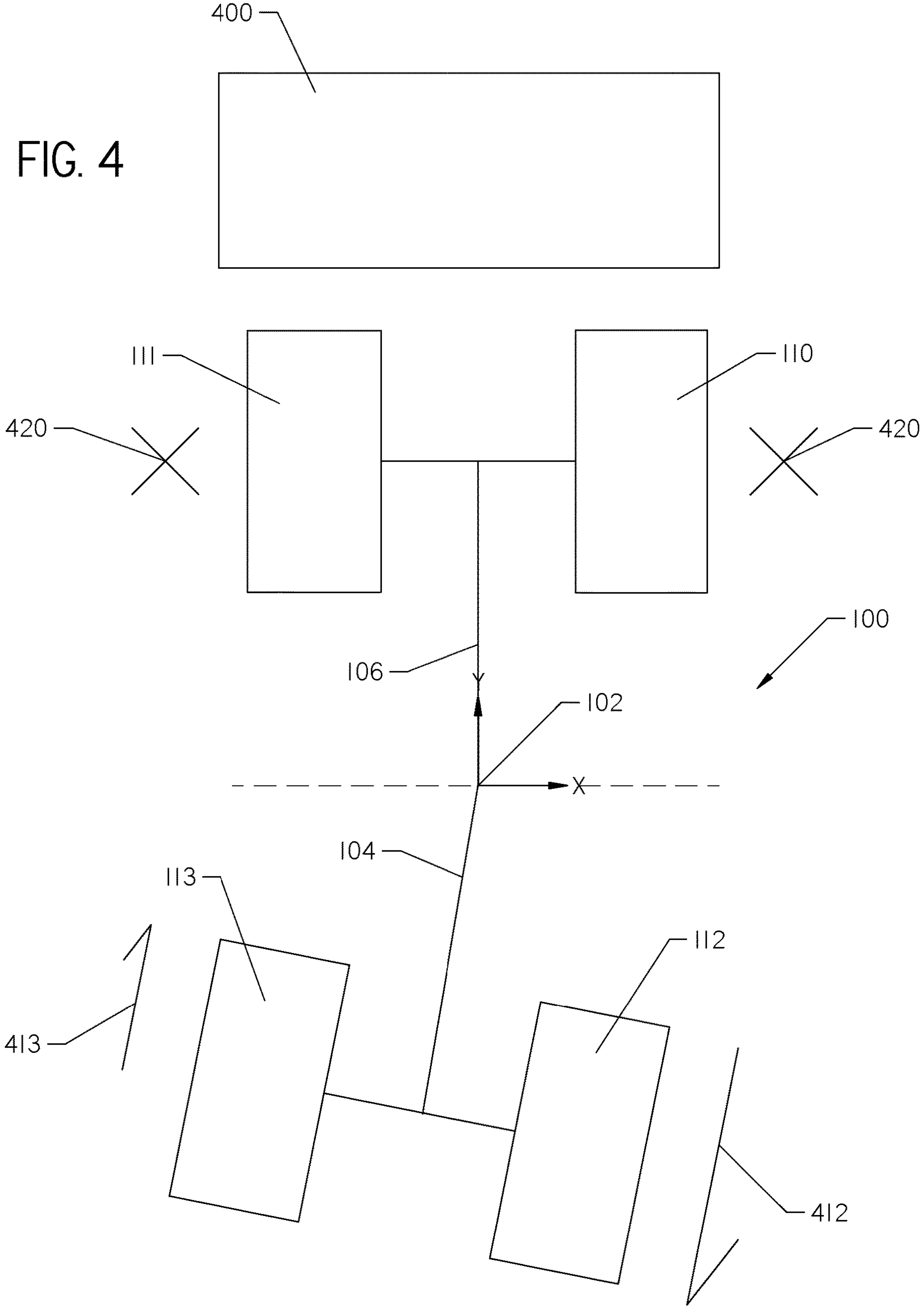
FIG. 4 is a top view illustration of the vehicle in static-articulation-end control mode. The direction of rotation of each wheel is shown by an arrow. Wheels which are not rotated are illustrated with an X.
Figure 5:
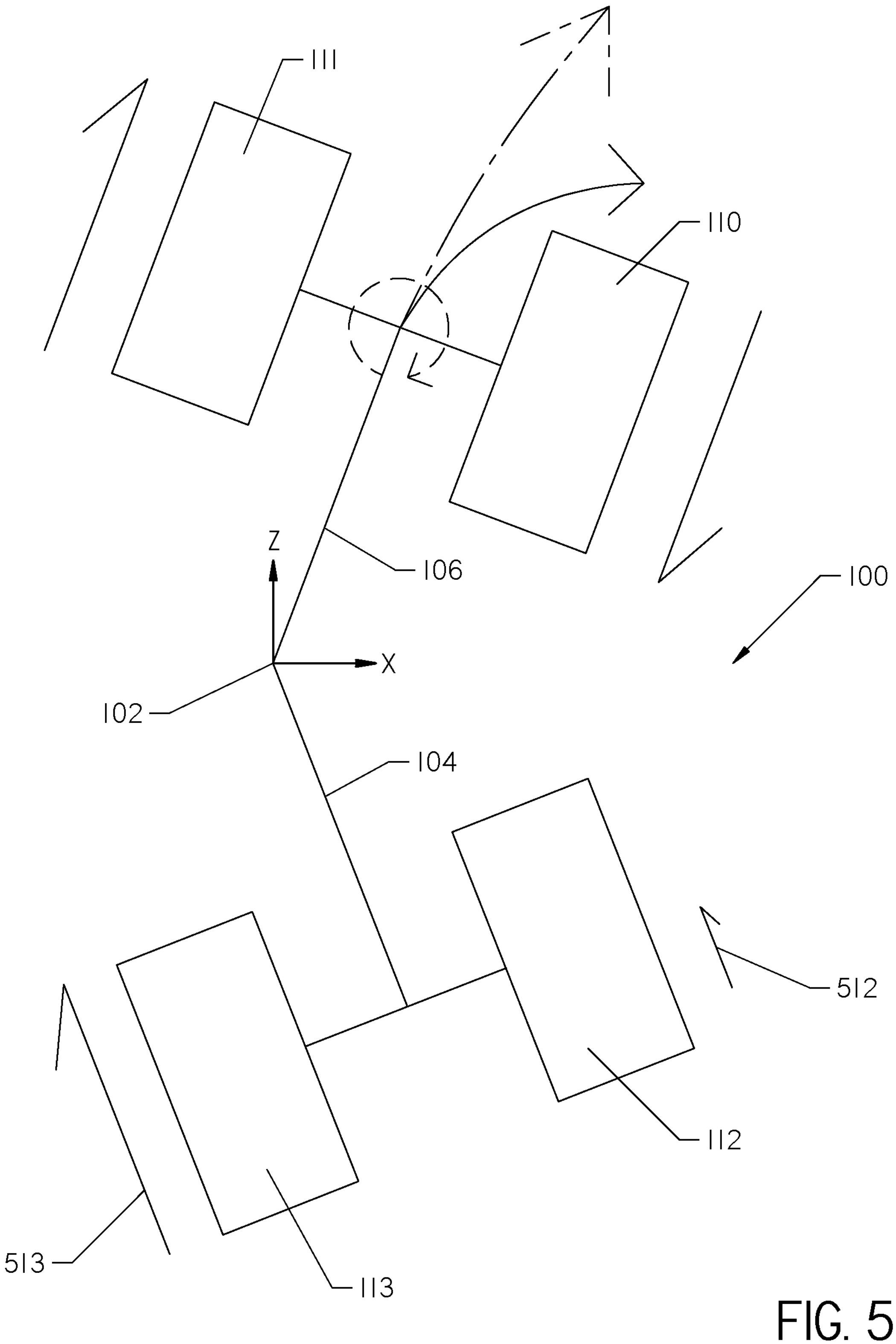
FIG. 5 is a top view illustration of the vehicle in pivot-turning mode. The direction of rotation of each wheel is shown by an arrow. Relative speeds are given by the magnitude of the arrow.

As seen in FIGS. 3-5, the motors 120 can simultaneously provide different rotational velocities—sometimes in different directions—to each of the wheels 110-113. This is advantageous because it allows the vehicle 100 to maneuver precisely, with each wheel 110-113 being particularly placed, and coordinated with the articulation joint 102. These features are discussed more herein.

Figure 2:
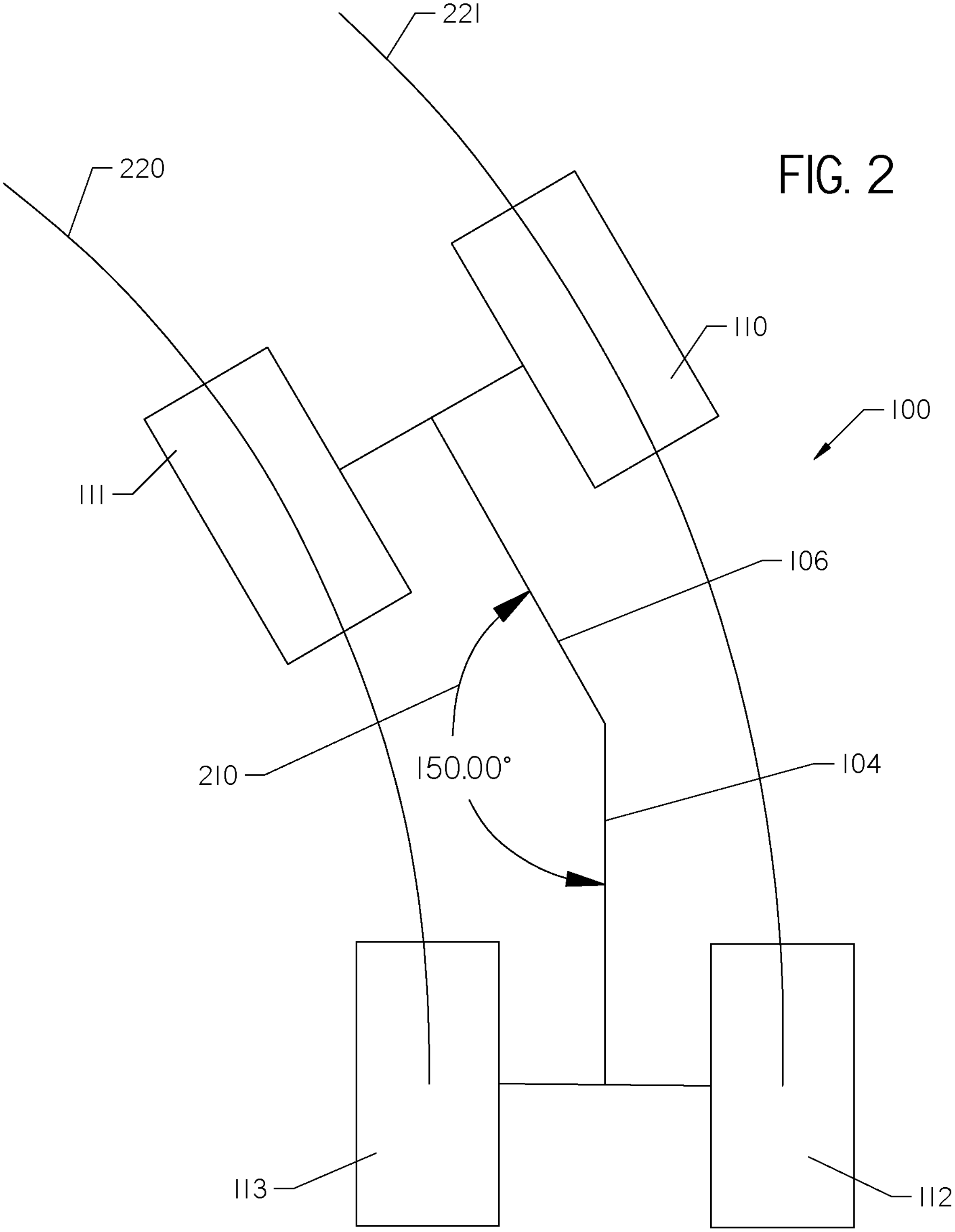
FIG. 2 is a top view illustration showing the radius of travel for the wheel of the work vehicle.

Turning now to FIG. 2, the radius of travel for the wheels 110-113 of the vehicle 100 is shown. In operation, the velocity output of each electric motor 120 is calculated and determined based on the chassis geometry and measured articulation angle 210 of the vehicle 100. In FIG. 2, inner and outer radii 220 and 221 are shown as arcs. The inner radius 220 passes through the left front and left rear wheels 111 and 113 during a left turn, while the outer radius 221 passes through the right front and right rear wheels 110 and 112 during the same turn. Alternatively, the inner radius would pass through the right front and right rear wheels 110 and 112 during a right turn, while the outer radius would pass through the left front and left rear wheels 111 and 113 during the right turn. Thus, the inner and outer radii 220 and 221 may alternate throughout operation, as there may be various configurations needed to turn or pivot the vehicle 100 while in use.

During operation, the values of the inner and outer radii 220 and 221 are measured and can be used to set the speeds of the wheels 110-113 as needed. For example, when the values of the two radii 220 and 221 are calculated, a ratio of inner and outer radii is determined. This ratio is used as a scalar to adjust the speed of the wheels 110-113 as needed. In one example, if the commanded ground speed of the vehicle 100 is 5 miles per hour (MPH) and the articulation angle 210 is 40 degrees, the inner wheel rotational velocity would be reduced to below 5 MPH to enable proper movement, while the outer wheel rotational velocity would stay the same, or increase. Many alternative combinations may be possible to allow the vehicle 100 to turn and pivot as needed in the field. As noted, the vehicle 100 may turn to the left, as shown in FIG. 2, or to the right (not shown).

By precisely tuning each wheel rotation rate, slippage of the wheels 110-113 is minimized, reducing damage to turf or other ground surfaces. Therefore, it should be understood that the vehicle 100 comprises the controller which varies and determines the rotation rate of each wheel 110-113 based upon the particular mode of the vehicle 100 and the angle of articulation at the articulation joint 102. In addition, the vehicle 100 is capable of multiple movement modes, as discussed below.

Turning now to FIG. 3, the vehicle 100 in traditional articulating mode is depicted. Arrows on FIG. 3 indicate a direction and magnitude of wheels 110-113 rotation. As previously mentioned herein, current articulating machines can damage the surface beneath them and require a significant amount of power to steer while standing still. The vehicle 100 aims to address these limitations by enabling the vehicle’s wheels 110-113 to counterrotate during turns and pivots. By counterrotating the wheels 110-113 on either end of the vehicle 100, and manipulating the articulation joint 102, both steering force and ground disturbance are greatly reduced.

Staying with FIG. 3, each wheel’s rate of rotation (controlled by its corresponding motor 120) is determined by the vehicle’s desired angle of articulation 210 and rate of speed. For example, if the front section 106 (FIG. 1) of the vehicle 100 is articulating clockwise about the articulation joint 102, as shown by arrow 320, the front wheels 110 and 111 should counter rotate at a uniform speed.

Similarly, for the rear section of the vehicle 100 to articulate counterclockwise about the articulation joint 102, the rear wheels 112 and 113 must counter rotate at a uniform speed. Both of these described articulations enable the vehicle 100 to be positioned for a clockwise turn 340.

Conversely, for the vehicle 100 to turn counterclockwise, the wheel rotations should be reversed, resulting in arrows 320 and 33*o* each being reversed as well. Alternative variations of this embodiment may be applied depending on the vehicle's use in the field.

Turning now to FIG. 4, an illustration of the vehicle 100 in static-articulation-end-control mode is shown. In this operation mode, the operator 101 may selectively control and change which section of the vehicle 100 moves and which section remains in a static condition. By using independently controlled electric motors 120, a specific section of the vehicle 100 can be articulated about the articulating joint 102 by counterrotating that section's wheels while simultaneously holding the other section's wheels fixed.

FIG. 4 shows how this articulation end control is accomplished. A bucket 400 is shown on the front end of the vehicle 100 and may be used to raise and lower loads. Depending on which direction the loads are to be taken, one section of the vehicle 100 may be selectively moved while the other section remains still. This allows the vehicle 100 to move around tighter turns and transport loads more efficiently.

FIG. 4 illustrates the vehicle 100 in static-articulation-end-control mode, where the rear section 104 of the vehicle 100 is articulating but the front section 106 is static. To articulate only the rear section of the vehicle 100, the front tires 110 and 111 are commanded by the processor not to move, as represented by "X"'s 420. The rear wheels 112 and 113 are commanded to counterrotate at rates determined by the machine geometry and measured articulation angle 210, as mentioned herein. The wheel speeds 412 and 413 represent the relative rotational velocity of each rear wheel 112-113. The length of each vector 412 and 413 represents the magnitude of speed at which each wheel 112 and 113 is rotating. Thus, for the vehicle's rear section to rotate clockwise, the outer rear wheel's speed 412 must rotate faster and in the opposite direction of the inner wheel's speed 413, as depicted in FIG. 4. As the angle at the articulation joint 102 changes, the relative magnitudes of vectors 412, 413 changes as well.

This configuration allows the rear section 104 of the vehicle 100 to pivot about the articulation joint 102 while the front section remains static. As shown by the vectors 413, 412 in FIG. 4, the direction of rotation is clockwise. Reversing the direction of wheels 112, 113 would result in counterclockwise rotation. While this embodiment shows the rear section 104 of the vehicle 100 being rotated, other forms of articulation are possible. For example, the rear wheels 112 and 113 could remain static while the front wheels 110 and 111 counterrotate and pivot around the articulation joint 102. The vehicle 100 is therefore capable of articulating either its front section or its rear section either clockwise or counterclockwise depending on the need in the field. An operator may choose which end articulates and which end stays static. The controller receives an operator input and directs the speed and direction of each wheel 110-113 in response.

Figure 9:
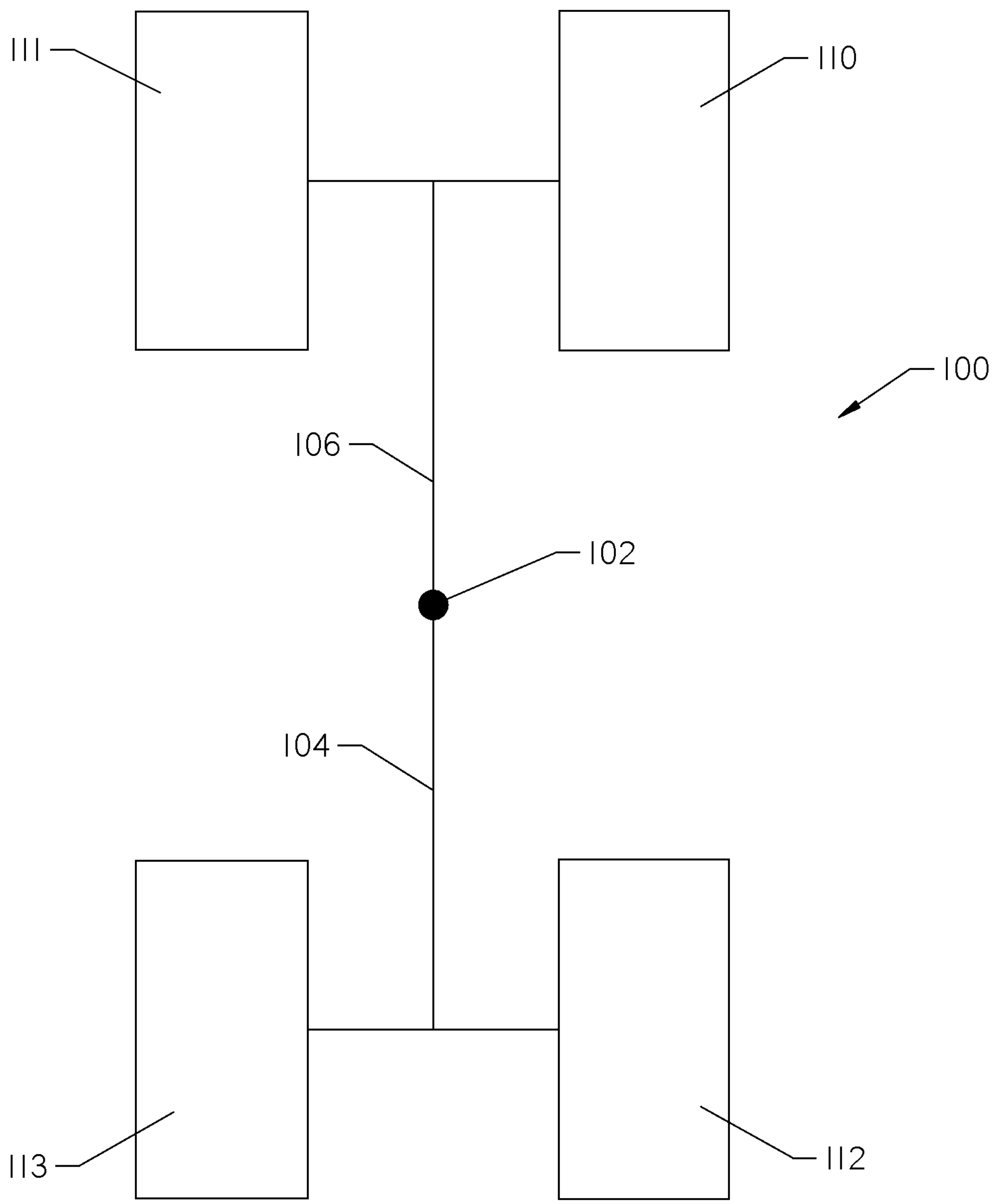
FIG. 9 is a top view illustration of the vehicle in skid steer mode.

Turning now to FIG. 9, while the present invention provides new ways for the vehicle 100 to turn and articulate, the vehicle 100 can still be used in skid steer mode. This is accomplished by locking the articulation joint 102 to the center position so that the front wheels are linearly aligned with the rear wheels. The wheels 110-113 can then be controlled and adjusted the same ways as current skid-steer machines, that is, by operating the left wheels 111, 113 as a unit—with the same velocity and direction—and doing the same with the right wheels 110, 112. Direction of the vehicle is changed by varying the right side or left side velocity, such that the vehicle turns in the direction of the slower pair of wheels. If needed, the vehicle 100 can be switched back to any of the articulating modes mentioned herein. This adaptability allows the vehicle 100 to operate in a variety of ways without having to use multiple pieces of machinery on a jobsite.

Turning now to FIG. 5, a vehicle 100 in pivot-turning mode is illustrated. For scenarios that do not require tight turns, the mode of FIG. 5 may provide a better option than the static end control articulating mode of FIG. 4. As shown in FIG. 5, pivot-turning mode is accomplished when the electric motors 120 are commanded to counterrotate only one section of the vehicle's wheels at a constant speed, while the other section's wheels rotate in the same direction, but different speeds. For example, FIG. 5 shows the front wheels 110 and 111 counterrotating at a uniform speed while the rear wheels 112 and 113 rotate forward, but at different speeds. This allows the front section 106 of the vehicle 100 to pivot around the articulation joint 102 (clockwise, in FIG. 5) while the vehicle 100 is still in motion. For adequate control in this setting, the inner-rear wheel 112 should rotate in the same direction, but at a different speed than the outer-rear wheel 113, as shown by vectors 512 and 513. In this way, the vehicle 100 pivots around the articulation joint 102 while advancing. Such a procedure tends to reduce the likelihood of jack-knifing away from the desired course.

Alternatively, the same setting can be used to pivot the rear section 104 of the vehicle 100, with the rear wheels 112 and 113 counterrotating at a uniform speed while the front wheels 110 and 111 rotate at different speeds but in the same direction. This would allow the rear section of the vehicle 100 to pivot about the articulation joint while the vehicle 100 moves. Enabling the vehicle 100 with pivot-turning mode provides increased maneuverability options to the vehicle 100 and operator 101.

As described herein, the present invention allows a single vehicle 100 to operate in skid steer mode, traditional articulating mode, pivot-turning mode, and static-articulation-end-control mode. The operator 101 may selectively control which mode the vehicle 100 is in, while also controlling which section of the vehicle moves, and in what direction. Thus, the operator may determine and control which section of the vehicle 100 will articulate from a static position. As shown, the operator 101 operates the vehicle 100 from a platform 109 extending from the rear section 104.

By selectively controlling the mode of operation, which section moves, and which way the vehicle 100 will articulate about the joint 102, operators 101 are capable of directing the vehicle into tighter turns and maneuvering about more obstacles than conventional vehicles. For example, the vehicle may carry loads through hallways in office structures during construction or renovation.

The articulation joint 102 may optionally be manipulated by one or more actuators 103 which cooperate to rotate the articulation joint and, therefore, the relative position of the front section 106 and rear section 104. Preferably, the one or more actuators comprise electric actuators. Such electric actuators 103 are adjustable by the controller to cooperate with the drive motors 120 such that the wheels 110-113 precisely move about the ground in coordination with the operator's desired movement of the vehicle 100.

The vehicle 100 controller is connected to a network of sensors disposed on the vehicle. For example, each motor 120 or wheel 110-113 may have a rotary encoder configured to detect the angular movement of the wheels. Because the diameter of the wheel 110-113 is known, the controller can determine the expected position of each wheel with respect to the other wheels and its own prior position. Further, the angle of the articulation joint 102 may be detected using sensors, such as absolute angle sensors.

The controller directs each of the wheels 110-113 and/or the articulation joint 102 to manipulate the vehicle 100 in accordance with the selected mode. The sensors disposed around the vehicle provide feedback to the controller which can be used to correct or fine-tune the movements of the vehicle 100. Other sensors, such as proximity sensors and tilt sensors may be utilized as well to provide additional information to the vehicle's controller.

Figure 6:
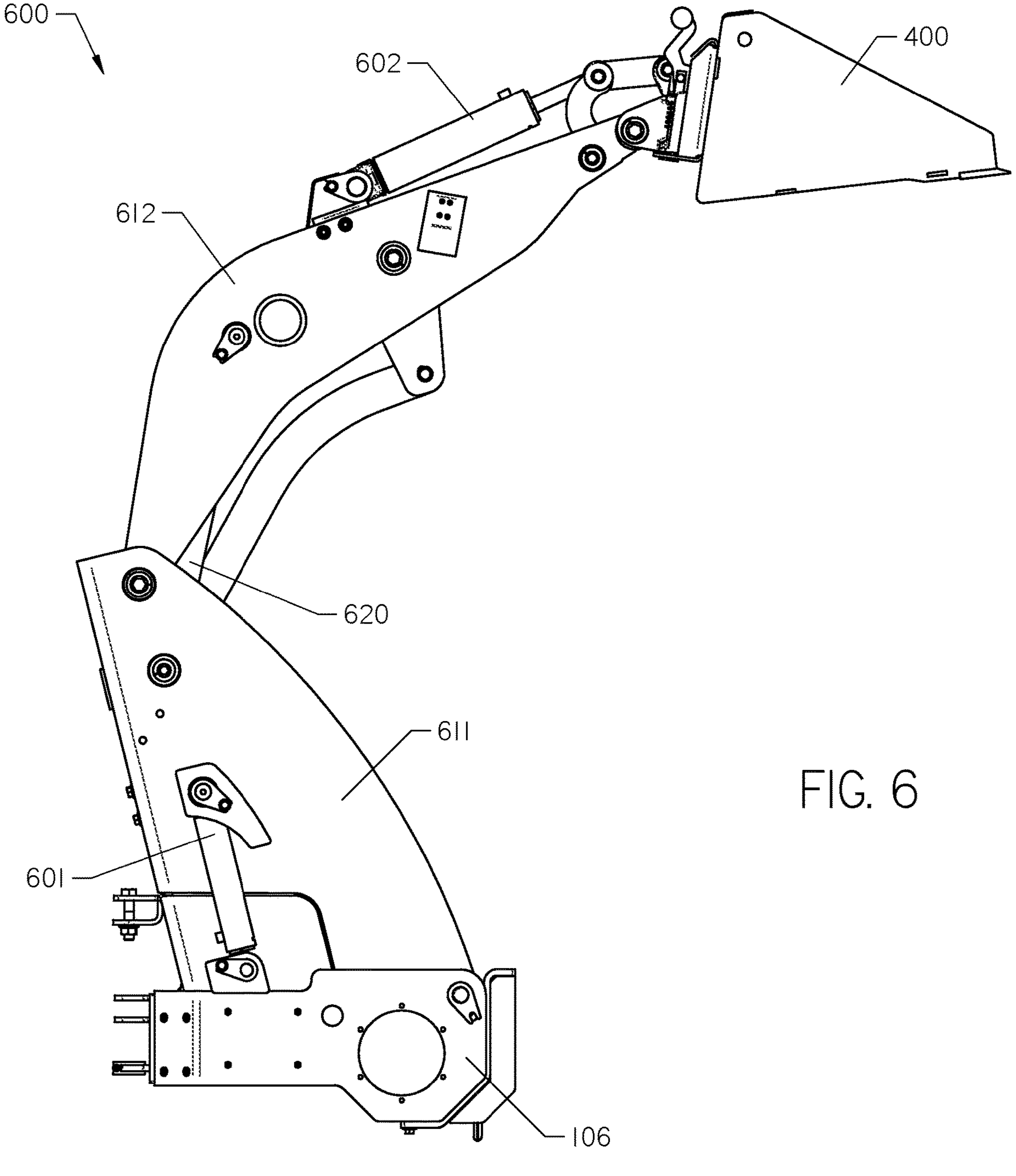
FIG. 6 is a side view of a lift arm of the vehicle while base actuators are in the compressed position.
Figure 7:
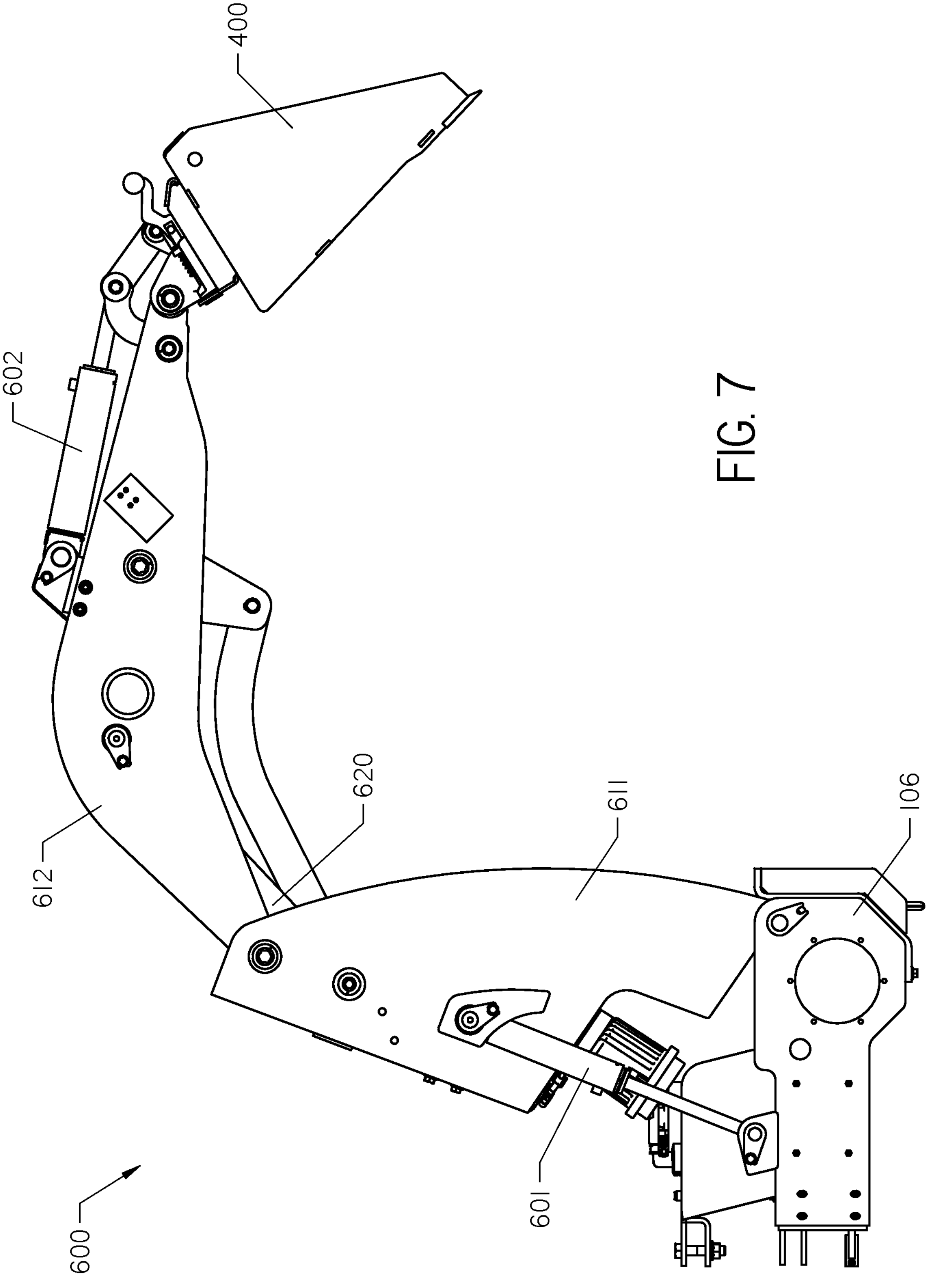
FIG. 7 is a side view of the lift arm of the vehicle while the base actuators are in the fully extended position.

As shown in FIGS. 6-7 the present invention provides a lift arm 600 of the tool vehicle 100. In order to lower materials into trash dumpsters, the tool vehicle may have to reverse while lowering the lift arm to avoid hitting the dumpster. This could be problematic, as the operator would have to focus on driving the vehicle while also lowering the lift arm, increasing the risk of tipping or damaging the surrounding areas.

As shown in FIGS. 1 and 6-7, the lift arm 600 has base actuators 601, a tool actuator 602, and a loader arm actuator 620. The lift arm 600 is comprised of a pivoting base 611, a loader arm 612, and the tool 400, in this case, a bucket. Actuator 601 extends, rotating the pivoting base 611 radially forward. Loader arm actuator 620 may also be used to radially pivot the loader arm 612. The tool 400 may be tilted by a tilt cylinder 602.

Changes may be made in the construction, operation and arrangement of the various parts, elements, steps and procedures described herein without departing from the spirit and scope of the invention as described in the following claims.

The invention claimed is:

1. An apparatus, comprising:

a first chassis, comprising:

a first ground supporting drive member, independently powered and rotated by a first motor; and a second ground supporting drive member, independently powered and rotated by a second motor;

a second chassis, comprising:

a third ground supporting drive member, independently powered and rotated by a third motor; and a fourth ground supporting drive member, independently powered and rotated by a fourth motor;

an articulation joint disposed between the first chassis and the second chassis; and a controller configured to:

receive an operator input; and direct a speed and a direction of each of the first, second, third and fourth motor in response to the operator input;

in response to the operator input indicating articulated turning:

direct the speed of the first and third ground-supporting drive members to maintain a position on a first radius; and direct the speed of the second and fourth ground-supporting drive members to maintain a position on a second radius.

2. The apparatus of claim 1 wherein the controller is further configured to:

direct a movement of the articulation joint in response to the operator input.

3. The apparatus of claim 1 wherein the articulation joint comprises an electric actuator.

4. The apparatus of claim 1 wherein the controller is configured to:

determine an angle of the articulation joint; and adjust the speed of the first, second, third and fourth motors using the angle of the articulation joint.

5. The apparatus of claim 1 wherein the controller is configured to:

maintain the first and second motor without rotation, thereby holding the first and second ground supporting drive member in place; and operate the third motor and fourth motor to counter-rotate the third and fourth ground supporting drive members.

6. The apparatus of claim 1 wherein the controller is configured to:

maintain the third and fourth motor without rotation, thereby holding the third and fourth ground supporting drive member in place; and operate the first motor and second motor to counter-rotate the first and second ground supporting drive members.

7. The apparatus of claim 1 further comprising:

a stand-on operating platform extending from the second chassis.

8. The apparatus of claim 1 further comprising a lift arm supported by the first chassis.

9. The apparatus of claim 1, wherein each of the first, second, third and fourth motors are electric.

10. A method of using the apparatus of claim 1, comprising:

selecting a desired curved path;

determining the first radius value indicative of a path of the first and third ground-supporting drive member and the second radius value indicative of a path of the second and fourth ground-supporting drive member;

with the controller, directing the speed of the first and third ground-supporting drive members to maintain a position on the first radius; and with the controller, directing the speed of the second and fourth ground-supporting drive members to maintain a position on the second radius.

11. A method of using the apparatus of claim 1, comprising:

rotating the first ground supporting drive member in a first direction at a first speed;

simultaneously, rotating the second ground-supporting drive member in a second direction at a second speed, wherein the second direction is opposite the first direction, thereby pivoting the first chassis about the articulation joint.

12. The method of claim 11 wherein the first speed and the second speed change as the first chassis pivots.

13. The method of claim 11 further comprising:

simultaneously, maintaining the third and fourth ground-supporting drive members without rotation.

14. The method of claim 10, further comprising:

measuring motor current feedback from the plurality of motors;

comparing the feedback to a calibrated feedback value; and reducing the current provided to the motor in response to a discrepancy between the feedback and the calibrated feedback value.

15. An articulated work vehicle, comprising:

a first chassis, comprising:

a first right wheel operatively connected to a first motor; and a first left wheel operatively connected to a second motor;

a second chassis, comprising:

a second right wheel operatively connected to a third motor; and a second left wheel operatively connected to a fourth motor;

an articulation joint disposed between the first chassis and the second chassis;

wherein each of the wheels is configured to be rotated in a first direction and a second direction, the second direction opposed to the first direction;

and further comprising:

a controller, operatively connected to each of the first, second, third and fourth motors, wherein the controller is configured to receive inputs and operate each of the first motor, second motor, third motor and fourth motor such that the articulated work vehicle moves along a desired path of travel;

wherein the controller is configured, in response to the inputs directing a curved path of travel, to direct the speed of the first right wheel and second right wheel to maintain a position on a first radius and direct the speed of the first left wheel and the second left wheel to maintain a position on a second radius.

16. The articulated work vehicle of claim 15, wherein the controller is operable in a first mode, a second mode, a third mode, and a fourth mode;

the first mode comprising:

locking the articulation joint such that the travel path of the first right wheel and second right wheel are linearly aligned;

rotating the first right wheel, first left wheel, second right wheel and second left wheel in the first direction; and rotating a selected pair of the first and second right wheels and the first and second left wheels more slowly than an unselected pair of the right wheels and the left wheels, thereby turning the articulated work vehicle in the direction of the selected pair;

the second mode comprising:

rotating the first left wheel and the first right wheel at the same speed in opposed directions; and rotating the second left wheel and the second right wheel at the same speed and opposed directions, wherein the second left wheel and first left wheel are also rotated in opposed directions, thereby pivoting the first chassis and second chassis about the articulation joint to reach a desired orientation;

the third mode comprising:

rotating the first left wheel and the first right wheel in opposed directions; and rotating the second left wheel and the second right wheel in the first direction at different speeds, thereby pivoting the first chassis about the articulation joint while the second chassis is moving; and the fourth mode comprising:

not allowing rotation in the first right wheel or first left wheel; and rotating the wheels on the second half of the vehicle in opposite directions and at different speeds, thereby pivoting the second chassis around the articulation joint without moving the first chassis.

17. The articulated work vehicle of claim 16 in which the controller is configured to select a mode in response to input from an operator.

18. The articulated work vehicle of claim 16, in which the controller is configured to switch between modes during the vehicle's operation.

19. The articulated work vehicle of claim 15, wherein the first radius is larger than the second radius when the inputs direct a left turn.

20. An apparatus, comprising:

a first chassis, comprising:

a first ground supporting drive member, independently powered and rotated by a first motor; and a second ground supporting drive member, independently powered and rotated by a second motor;

a second chassis, comprising:

a third ground supporting drive member, independently powered and rotated by a third motor; and a fourth ground supporting drive member, independently powered and rotated by a fourth motor;

an articulation joint disposed between the first chassis and the second chassis; and a controller configured to:

receive an operator input; and direct a speed and a direction of each of the first, second, third and fourth motor in response to the operator input; and in response to the operator input directing a turn, coordinate operation of the first and third ground supporting drive members as a first pair, and the second and fourth ground supporting drive members as a second pair, such that the first pair follows a first curved path of travel and the second pair follows a second curved path of travel that is different from the first curved path of travel.

* * * * *